(12) United States Patent
Furuse et al.

(10) Patent No.: US 9,073,790 B2
(45) Date of Patent: Jul. 7, 2015

(54) CORDIERITE SINTERED BODY AND MEMBER FOR SEMICONDUCTOR DEVICE COMPOSED OF CORDIERITE SINTERED BODY

(75) Inventors: Tatsuji Furuse, Kirishima (JP); Hiroaki Seno, Kirishima (JP); Shuichi Iida, Kirishima (JP); Kouki Okayama, Kirishima (JP); Toshiaki Shigeoka, Kirishima (JP)

(73) Assignee: Kyocera Corporation, Kyoto (JP)

( * ) Notice: Subject to any disclaimer, the term of this patent is extended or adjusted under 35 U.S.C. 154(b) by 179 days.

(21) Appl. No.: 14/001,129

(22) PCT Filed: Feb. 22, 2012

(86) PCT No.: PCT/JP2012/054243
§ 371 (c)(1),
(2), (4) Date: Mar. 6, 2014

(87) PCT Pub. No.: WO2012/115136
PCT Pub. Date: Aug. 30, 2012

(65) Prior Publication Data
US 2014/0171288 A1    Jun. 19, 2014

(30) Foreign Application Priority Data

Feb. 24, 2011 (JP) ................................ 2011-038567
Jun. 30, 2011 (JP) ................................ 2011-146034

(51) Int. Cl.
| C04B 35/195 | (2006.01) |
| C04B 35/185 | (2006.01) |
| C04B 35/626 | (2006.01) |
| C04B 35/645 | (2006.01) |

(52) U.S. Cl.
CPC ............ *C04B 35/195* (2013.01); *C04B 35/185* (2013.01); *C04B 35/62685* (2013.01); *C04B 35/62695* (2013.01); *C04B 35/6455* (2013.01); *C04B 2235/3206* (2013.01); *C04B 2235/3208* (2013.01); *C04B 2235/3217* (2013.01); *C04B 2235/3243* (2013.01); *C04B 2235/3244* (2013.01); *C04B 2235/3262* (2013.01); *C04B 2235/3418* (2013.01); *C04B 2235/3463* (2013.01); *C04B 2235/3481* (2013.01); *C04B 2235/5436* (2013.01); *C04B 2235/77* (2013.01); *C04B 2235/80* (2013.01); *C04B 2235/85* (2013.01); *C04B 2235/96* (2013.01); *C04B 2235/9607* (2013.01); *C04B 2235/9661* (2013.01); *C04B 2235/9692* (2013.01)

(58) Field of Classification Search
CPC .... C04B 35/195; C04B 35/185; C04B 35/10; C04B 35/057
See application file for complete search history.

(56) References Cited

U.S. PATENT DOCUMENTS

| 8,709,577 B2 * | 4/2014 | Beall et al. ..................... 428/116 |
| 8,999,224 B2 * | 4/2015 | Beall et al. ..................... 264/631 |
| 2005/0215417 A1 | 9/2005 | Teratani et al. |

FOREIGN PATENT DOCUMENTS

| JP | 2-208253 | 8/1990 |
| JP | 11-130520 | 5/1999 |
| JP | 2002167267 | 6/2002 |
| JP | 2002167268 | 6/2002 |
| JP | 2005314215 | 11/2005 |
| JP | 2010173878 | 8/2010 |

OTHER PUBLICATIONS

English translation of the International Search Report issued in PCT/JP2012/054243 dated Apr. 24, 2012.

* cited by examiner

*Primary Examiner* — Karl Group

(57) ABSTRACT

A cordierite sintered body and a member for semiconductor manufacturing apparatus are disclosed. The cordierite sintered body includes a crystal phase and an amorphous phase. The crystal phase includes a main crystal phase that essentially consists of cordierite crystal grains; and a sub crystal phase that includes sub crystal grains containing alumina, mullite or sapphirine. The amorphous phase contains calcium and is located at grain boundaries of the cordierite crystal grains and the sub crystal grains. A crystal phase proportion of the main crystal phase to the crystal phase (or total of the main crystal phase and the sub crystal phase) is 95% to 97.5% by mass or less. A crystal phase proportion of the sub crystal phase to the crystal phase is 2.5% to 5% by mass or less. The sintered body contains calcium by 0.4% to 0.6% by mass or less in terms of CaO.

6 Claims, No Drawings

US 9,073,790 B2

CORDIERITE SINTERED BODY AND MEMBER FOR SEMICONDUCTOR DEVICE COMPOSED OF CORDIERITE SINTERED BODY

CROSS-REFERENCE TO RELATED APPLICATIONS

This application is a national phase of the International Application PCT/JP2012/054243 filed Feb. 22, 2012 that claims priority from the Japanese patent applications JP2011-038567 filed on Feb. 24, 2011 and JP2011-146034 filed on Jun. 30, 2011. The content of these aforementioned documents is herewith incorporated by reference.

TECHNICAL FIELD OF THE INVENTION

The present invention relates to a cordierite sintered body and a member for semiconductor manufacturing apparatus, such as an electrostatic chuck, a stage, and a jig used in a semiconductor manufacturing process, which are composed of the cordierite sintered body.

BACKGROUND OF THE INVENTION

A cordierite sintered body has been previously known as a low-heat expansion ceramic and has been used for a filter, a honeycomb, a refractory, and the like. In recent years, the cordierite sintered body has been used as a member for semiconductor manufacturing apparatus where the low-heat expansibility is utilized.

Specifically, in an exposure apparatus which is one of semiconductor manufacturing apparatuses, for example, a stage serving as a support to place a silicon wafer corresponds to the above-described member for semiconductor manufacturing apparatus. Such a stage has been required to exhibit a small dimensional change due to heat in an exposure treatment and good shape stability to improve exposure accuracy. A member constituting the stage has been required to exhibit high stiffness (Young's modulus) that is not causing vibration easily, in addition to low-heat expansibility, because it is required that vibration of the silicon wafer after being placed and moved does not occur easily.

Accordingly, a cordierite sintered body has been proposed, that has enhanced sinterability and improved Young's modulus without impairing the low-heat expansion characteristic by combining a rare earth element oxide at a predetermined ratio and allowing the rare earth element oxide to present as a specific crystal phase at grain boundaries of cordierite crystals to enhance the stiffness of the cordierite sintered body (refer to PTL 1).

The following is a list of the aforementioned background art

PTL 1: Japanese Unexamined Patent Application Publication No. 11-130520

In a manufacturing process of a semiconductor such as LSI, circuits have been made fine rapidly and, therefore, line widths thereof have become at a highly precise level of the order of submicrons, and a further improvement in precision of the member for semiconductor manufacturing apparatus composed of a cordierite sintered body has been required. Meanwhile, good mechanical strength compatible with upsizing of the semiconductor manufacturing apparatus has been required. In addition, since a decrease in a treatment speed due to upsizing is desired to be suppressed, a material constituting the member for semiconductor manufacturing apparatus has been required to have a small specific gravity in order to facilitate weight reduction.

The present invention has been made to solve the above-described issues, and it is an object to provide a cordierite sintered body having a small thermal expansion coefficient, high specific stiffness (=Young's modulus/specific gravity) and high mechanical strength and a member for semiconductor manufacturing apparatus composed of the cordierite sintered body.

SUMMARY OF THE INVENTION

A cordierite sintered body according to the present invention includes cordierite as a main crystal phase, alumina, mullite and sapphirine as a sub crystal phase, amorphous phase containing Ca is present at grain boundaries, a crystal phase proportion of the above-described main crystal phase is 95% by mass or more and 97.5% by mass or less, a crystal phase proportion of the above-described sub crystal phase is 2.5% by mass or more and 5% by mass or less, and a content of Ca relative to the whole amount is 0.4% by mass or more and 0.6% by mass or less in terms of CaO.

In addition, a member for semiconductor manufacturing apparatus according to the present invention is composed of the cordierite sintered body having the above-described configuration.

According to the cordierite sintered body of the present invention, a cordierite sintered body having a small thermal expansion coefficient, high specific stiffness (=Young's modulus/specific gravity) and high mechanical strength can be provided. In addition, the cordierite sintered body has the above-described good characteristics and, therefore, can be used as a member for semiconductor manufacturing apparatus favorably.

DETAILED DESCRIPTION OF THE INVENTION

A cordierite sintered body according to the present embodiment includes cordierite, that is, a compound oxide represented by a general formula $Mg_2Al_4Si_5O_{18}$, as a main crystal phase, and alumina ($Al_2O_3$), mullite ($Al_6Si_2O_{13}$) and sapphirine (($Mg_4Al_4$)($Al_4Si_2$)$O_{20}$) as a sub crystal phase. In this regard, limitation to a stoichiometric composition represented by the above-described general formula is not necessary, and a somewhat deviated (non-stoichiometric) substance may be employed. In addition, an amorphous phase containing Ca is present at grain boundaries. Furthermore, in the cordierite sintered body of the present embodiment, the crystal phase proportion of the main crystal phase is 95% by mass or more and 97.5% by mass or less, and that of the sub crystal phase is 2.5% by mass or more and 5% by mass or less, where the crystal phase proportion is determined by performing an X-ray diffraction measurement in the range of $2\theta=8°$ to $100°$ with an X-ray diffraction apparatus through the use of $K\alpha$ rays of Cu and performing analysis through the use of Rietveld analysis program RIETAN. Meanwhile, the content of Ca relative to 100% by mass of the whole components of the cordierite sintered body (hereafter referred to as the whole amount) is 0.4% by mass or more and 0.6% by mass or less in terms of CaO.

Consequently, the thermal expansion coefficient of the cordierite sintered body according to the present embodiment becomes small, and the specific stiffness (=Young's modulus/specific gravity) and the mechanical strength becomes high. Specifically, the absolute value of the thermal expansion coefficient is 0.1 ppm/° C. or less, the specific stiffness is 56.0

GPa·cm³/g or more, and the four-point bending strength is 240 MPa or more. In addition, the thermal conductivity is 4.0 W/m·K or more.

Here, the thermal expansion coefficient can be decreased because cordierite (about −0.19 ppm/° C.), which is the main crystal phase, having a negative thermal expansion coefficient, and alumina (about 5.2 ppm/° C.), mullite (about 5.0 ppm/° C.), and sapphirine (about 6.0 ppm/° C.), which is the sub crystal phase, having a positive thermal expansion coefficient are within the above-described range of crystal phase proportions and, thereby, the positive and negative thermal expansion coefficients cancel each other out. Therefore, if the crystal phase proportion of the main crystal phase is less than 95% by mass, the thermal expansion coefficient increases in the positive side, and if 97.5% by mass is exceeded, the thermal expansion coefficient increases in the negative side.

Meanwhile, the specific stiffness and the mechanical strength can be enhanced because an amorphous phase containing Ca is present at grain boundaries and the content of Ca relative to the whole amount is 0.4% by mass or more and 0.6% by mass or less in terms of CaO in addition to the above-described configuration of the main crystal phase and the sub crystal phase.

In the case where the content of Ca is less than 0.4% by mass in terms of CaO, densification of the cordierite sintered body becomes insufficient easily, and the Young's modulus decreases. Meanwhile, in the case where the Ca content is more than 0.6% by mass, large amounts of Ca compounds such as anorthite, are generated easily at the grain boundaries, the Young's modulus decreases and, in addition, the specific gravity and the thermal expansion coefficient increase.

On the other hand, in the case where the content of Ca relative to the whole amount is 0.4% by mass or more and 0.6% by mass or less in terms of CaO, the sinterability is improved by facilitating grain growth of cordierite crystal serving as the main crystal phase and, in addition, the specific stiffness and the mechanical strength can be enhanced by suppressing excessive growth of cordierite crystal because of the presence of the sub crystal phase at the above-described crystal phase proportion. Also, Ca has a small atomic weight and a low specific gravity as compared with the rare earth element (RE) used in PTL 1 and, therefore, is a cause of enhancement of the specific stiffness.

In this regard, the content relative to the whole amount in terms of CaO can be determined by determining the Ca content with a fluorescent X-ray analyzer, an ICP (Inductively Coupled Plasma) emission spectrochemical analyzer, or a wavelength dispersive X-ray micro analyzer (EPMA) and converting the resulting content to CaO.

Also, the thermal expansion coefficient may be measured by laser interferometry in conformity with JISR 3251-1995, the specific gravity may be measured by an Archimedean method, and the Young's modulus at room temperature may be measured by an ultrasonic pulse method in conformity with JIS R1602-1995. Also, the four-point bending strength may be measured in conformity with JISR1601-2008. Furthermore, the thermal conductivity may be measured by a laser flash method. In addition, the presence of Ca can be examined by observing grain boundaries with a transmission electron microscope (TEM).

Meanwhile, the share of the crystal phase proportion of the sub crystal phase held by the alumina is 35% or more and 45% or less, that held by the mullite is 25% or more and 35% or less, and that held by the sapphirine is 25% or more and 40% or less. Although the reason is not certain, satisfaction of these ranges can further decrease the thermal expansion coefficient and further enhance the specific stiffness and the mechanical strength. Specifically, the absolute value of the thermal expansion coefficient is 0.03 ppm/° C. or less, the specific stiffness is 57.0 GPa·cm³/g or more, and the four-point bending strength is 250 MPa or more.

Furthermore, the cordierite sintered body according to the present embodiment contains zirconia ($ZrO_2$) and the content of zirconia relative to the whole amount is preferably 3.0% by mass or less. Consequently, the mechanical strength can be further enhanced. Meanwhile, zirconia has a positive thermal expansion coefficient of about 9.2 ppm/° C. and, therefore, can also serve as an adjuster for thermal expansion coefficient. In addition, in the case where zirconia is contained, the thermal expansion coefficient is small, the specific stiffness is high and, furthermore, the chemical resistance against chemical agents such as acids and alkalis, can be enhanced, while the mechanical strength is improved.

In this regard, the content relative to the whole amount in terms of $ZrO_2$ can be determined by determining the Zr content with a fluorescent X-ray analyzer, an ICP emission spectrochemical analyzer, or a wavelength dispersive X-ray micro analyzer and converting the resulting content to $ZrO_2$.

Meanwhile, in the case where the cordierite sintered body according to the present embodiment contains transition metal elements such as Cr, Mn, Fe, Co, Ni, and Cu, a color tone having good visibility and antifouling property can be made. Moreover, in order to suppress scattering of the light which exerts an influence on the exposure accuracy, while the visibility and the antifouling property are provided, as for the color tone of the cordierite sintered body, it is preferable that the psychometric lightness L* in the CIE1976L*a*b* color space be 70 or more and 82 or less, and the psychometric chroma coordinates a* and b* be −5 or more and 1 or less and 0 or more and 2 or less, respectively.

In this regard, the psychometric lightness L* and the psychometric chroma coordinates a* and b* in the CIE1976L*a*b* color space are measured by a spectrophotometer in a wavelength range of 360 to 740 nm.

Then, as for manufacturing of the cordierite sintered body having the above-described color tone, for example, Mn and Cr are used as colorants, the content relative to the whole amount is specified as 0.3% by mass or more and 0.7% by mass or less in terms of $MnCr_2O_4$ and, thereby, the cordierite sintered body having the above-described color tone can be obtained.

Also, in the case where the cordierite sintered body according to the present embodiment contains $MnCr_2O_4$ as a crystal phase, color shading can be reduced. Although the reason for this is not certain, scattering of the light becomes more stable because of reduced color shading, so that the exposure accuracy can be enhanced.

Then, the cordierite sintered body according to the present embodiment has a small thermal expansion coefficient and high specific stiffness (=Young's modulus/specific gravity) and mechanical strength and, therefore, can be used as a member for semiconductor manufacturing apparatus favorably. Specifically, in the case of use as a stage of an exposure device, the treatment speed and the exposure accuracy can be improved because a dimensional change due to heat in an exposure treatment is small, the shape stability is good, high-speed transfer is possible on the basis of weight reduction, and vibration is well controlled. In addition, the stage can exhibit high stability because of good mechanical strength.

Meanwhile, the cordierite sintered body according to the present embodiment has still better characteristics, that is, the absolute value of the thermal expansion coefficient is 0.03 ppm/° C. or less, the specific stiffness is 57.0 GPa·cm³/g or more, and the four-point bending strength is 250 MPa or more, because the share of the sub crystal phase proportion held by the alumina is 35% or more and 45% or less, the mullite holds 25% or more and 35% or less, and the sapphirine holds 25% or more and 40% or less. Consequently, the treatment speed and the exposure accuracy can be further improved and the reliability of mechanical strength can be further enhanced, so that the member for semiconductor manufacturing apparatus can respond to still higher requirements.

Next, a method for manufacturing the cordierite sintered body according to the present embodiment will be described. Initially, a primary raw material is prepared by weighing a synthetic cordierite powder, an aluminum oxide powder, and a calcium carbonate powder at a predetermined ratio, where the synthetic cordierite powder is produced by calcining and pulverizing a mixed powder in which a magnesium carbonate powder, an aluminum oxide powder, and a silicon oxide powder are blended at a predetermined ratio in advance. Thereafter, the primary raw material is wet-mixed, and a slurry is obtained by adding a predetermined amount of binder.

Subsequently, the slurry is sprayed and granulated by a spray granulation method (spray drying method), the resulting granules are formed by an isostatic pressing method (rubber press) or a powder pressing method and, as necessary, cutting is performed, and then, this is fired in a firing furnace in an air atmosphere at a maximum temperature of higher than 1,400° C. and 1,450° C. or lower and, thereby, the cordierite sintered body according to the present embodiment can be obtained.

In this regard, the firing temperature is specified to be higher than 1,400° C. in order to generate mullite and sapphirine serving as the sub crystal phase in the cordierite sintered body. Meanwhile, the alumina powder is included in the primary raw material and, thereby, alumina, mullite, and sapphirine can be contained as the sub crystal phase.

Also, in order to improve the chemical resistance and to adjust the thermal expansion coefficient while the mechanical strength is improved, a zirconium oxide powder may be added to the primary raw material in such a way that the content of zirconia relative to the whole amount becomes 3.0% by mass or less.

Also, in order to obtain colored cordierite ceramic, a powder containing Cr, Mn, Fe, Co, Ni, Cu, and the like serving as a raw material powder may be added to the primary raw material. Also, in order that the cordierite sintered body contains $MnCr_2O_4$ as a crystal phase, a $MnCr_2O_4$ powder may be added to the primary raw material.

Also, in order that the cordierite sintered body has an absolute value of the thermal expansion coefficient of 0.03 ppm/° C. or less, a specific stiffness of 57.0 GPa·cm$^3$/g or more, and a four-point bending strength of 250 MPa or more, specifically, a primary raw material may be formed from 95% by mass or more of synthetic cordierite powder, 3% by mass or more of aluminum oxide powder, and a calcium carbonate powder, the content of which becomes 0.4% by mass or more and 0.6% by mass or less in terms of CaO and manufacturing may be performed by the above-described manufacturing method.

In addition, after firing, a more densified cordierite sintered body can be obtained by performing hot isotropic pressing at 1,000° C. to 1,350° C. while a pressure of 100 to 200 MPa is applied.

EXAMPLE 1

A synthetic cordierite powder having an average particle diameter of 3 µm, an aluminum oxide powder having an average particle diameter of 1 µm, a calcium carbonate powder, and a powder containing transition metal elements were prepared and weighed at proportions which constitute the cordierite sintered body composition shown in Table 1. In this regard, the calcium carbonate powder was weighed at the proportion shown in Table 1 in terms of CaO, and the powder containing transition metal elements was weighed at the proportion shown in Table 1 in terms of oxides of the transition metal elements shown in Table 1. Subsequently, pure water was added, and mixing was performed in a ball mill for 24 hours. Thereafter, a slurry was prepared by adding a binder, and the slurry was sprayed by the spray granulation method, to obtain granules.

Then, the resulting granules were put into a mold and shaped by application of a pressure of 1 t/cm$^2$, and firing was performed in an air atmosphere at 1,410° C., and subsequently, hot isotropic pressing was performed at 1,300° C., while a pressure of 150 MPa was applied, to obtain cordierite sintered bodies of Sample Nos. 1 to 14.

Then, test pieces were produced from the resulting sintered body. The thermal expansion coefficient was measured by laser interferometry in conformity with JISR 3251-1995, the specific gravity was measured by an Archimedean method, and the Young's modulus at room temperature was measured by an ultrasonic pulse method in conformity with JIS R1602-1995. Also, the four-point bending strength was measured in conformity with JISR1601-2008. Also, the thermal conductivity was measured by a laser flash method.

Meanwhile, the crystal phase proportions of cordierite, alumina, mullite, and sapphirine were determined by performing an X-ray diffraction measurement in the range of 2θ=8° to 100° with an X-ray diffractometer through the use of Kα rays of Cu and performing analysis through the use of Rietveld analysis program RIETAN. The results of the crystal phase proportion, the thermal expansion coefficient, the specific gravity, the Young's modulus, the specific stiffness, the four-point bending strength, and the thermal conductivity are shown in Table 2.

Also, the amount of Ca in the cordierite sintered body was determined with a wavelength dispersive X-ray micro analyzer (EPMA) and was converted to CaO, and it was ascertained that the contents corresponded to the amounts of addition described in Table 1. Likewise, as for Mn, Cr, and Fe, the amounts of Mn, Cr, and Fe in the cordierite sintered body were determined with EPMA. As for Sample Nos. 1 to 6 and 10 to 14, it was ascertained that existence regions of Mn and Cr overlapped each other, and therefore, it was assumed that $MnCr_2O_4$ was present and the resulting amount of Cr was converted to $MnCr_2O_4$. Meanwhile, as for Sample Nos. 7 to 9, the amounts of Mn, Cr, and Fe were converted to $MnO_2$, $Cr_2O_3$, $Fe_2O_3$, respectively, and it was ascertained that the contents corresponded to the amounts of addition of the transition metal elements described in Table 1. Furthermore, the grain boundaries of each sample were observed with a transmission electron microscope (TEM), and it was ascertained that Ca was present at the grain boundaries except Sample No. 12.

The results of visual observation of the color tone and the color shading of each sample are shown in Table 3. In this regard, as for the color shading on the basis of visual observation, the case where no shades were observed in the color tone at a distance of 50 cm from the sample was specified as "excellent" and the case where shades were somewhat observed in the color tone was specified as "good". In addition, each sample was subjected to a measurement with a spectrophotometer in a wavelength range of 360 to 740 nm, and results are shown in Table 3.

TABLE 1

| Sample No. | Raw material | | | | |
|---|---|---|---|---|---|
| | Cordierite powder % by mass | Aluminum oxide powder % by mass | Calcium carbonate powder % by mass (*1) | Power containing transition metal element Type | % by mass (*2) |
| 1 | 95.4 | 3.6 | 0.4 | $MnCr_2O_4$ | 0.6 |
| 2 | 95.6 | 3.4 | 0.4 | $MnCr_2O_4$ | 0.6 |
| 3 | 95.8 | 3.0 | 0.5 | $MnCr_2O_4$ | 0.7 |
| 4 | 95.6 | 3.7 | 0.5 | $MnCr_2O_4$ | 0.2 |
| 5 | 95.6 | 3.6 | 0.5 | $MnCr_2O_4$ | 0.3 |
| 6 | 93.0 | 3.5 | 0.5 | $MnCr_2O_4$ | 3.0 |
| 7 | 94.0 | 5.0 | 0.6 | $MnO_2$ | 0.4 |
| 8 | 98.5 | 0.5 | 0.6 | $Cr_2O_3$ | 0.4 |
| 9 | 99.0 | 0.2 | 0.6 | $Fe_2O_3$ | 0.2 |
| 10 | 96.0 | 0.0 | 0.5 | $MnCr_2O_4$ | 3.5 |
| 11 | 99.0 | 0.0 | 0.5 | $MnCr_2O_4$ | 0.5 |
| 12 | 95.0 | 4.5 | 0.2 | $MnCr_2O_4$ | 0.4 |
| 13 | 95.0 | 3.6 | 0.9 | $MnCr_2O_4$ | 0.5 |
| 14 | 90.0 | 9.0 | 0.4 | $MnCr_2O_4$ | 0.6 |

(*1) indicates % by mass in terms of CaO
(*2) indicates % by mass in terms of oxide described in column of "Type"

TABLE 2

| Sample No. | Crystal phase proportion | | | | Characteristics | | | | | |
|---|---|---|---|---|---|---|---|---|---|---|
| | Cordierite % by mass | Alumina % by mass | Mullite % by mass | Sapphirine % by mass | Thermal expansion coefficient ppm/° C. | Specific gravity g/cm³ | Young's modulus GPa | Specific rigidity (*3) | Four-point bending strength MPa | Thermal conductivity W/m-K |
| 1 | 97.0 | 1.1 (36.7) | 0.8 (26.6) | 1.1 (36.7) | 0.02 | 2.56 | 146 | 57.0 | 256 | 4.4 |
| 2 | 97.2 | 1.0 (35.7) | 0.8 (28.6) | 1.0 (35.7) | 0.005 | 2.55 | 146 | 57.3 | 254 | 4.3 |
| 3 | 97.4 | 1.0 (38.5) | 0.7 (26.9) | 0.9 (34.6) | −0.03 | 2.53 | 145 | 57.3 | 250 | 4.3 |
| 4 | 97.2 | 1.2 (42.8) | 0.8 (28.6) | 0.8 (28.6) | 0.01 | 2.55 | 146 | 57.3 | 257 | 4.4 |
| 5 | 97.2 | 1.1 (39.3) | 0.8 (28.6) | 0.9 (32.1) | 0.02 | 2.56 | 146 | 57.0 | 254 | 4.4 |
| 6 | 95.0 | 2.8 (56.0) | 1.2 (24.0) | 1.0 (20.0) | 0.09 | 2.57 | 147 | 57.2 | 260 | 4.4 |
| 7 | 95.0 | 4.5 (90.0) | 0.3 (6.0) | 0.2 (4.0) | 0.09 | 2.55 | 145 | 56.9 | 243 | 4.5 |
| 8 | 95.5 | 0.4 (8.9) | 3.0 (66.6) | 1.1 (24.4) | 0.09 | 2.55 | 145 | 56.9 | 242 | 4.0 |
| 9 | 96.0 | 0.1 (2.5) | 2.2 (55.0) | 1.7 (42.5) | 0.08 | 2.56 | 146 | 57.0 | 255 | 3.9 |
| 10 | 96.0 | 0.0 (0.0) | 2.8 (70.0) | 1.2 (30.0) | 0.12 | 2.55 | 138 | 54.1 | 248 | 3.9 |
| 11 | 98.0 | 0.0 (0.0) | 1.5 (75.0) | 0.5 (25.0) | −0.11 | 2.52 | 139 | 55.2 | 190 | 3.8 |
| 12 | 96.0 | 2.5 (62.5) | 0.8 (20.0) | 0.7 (17.5) | −0.01 | 2.50 | 125 | 50.0 | 170 | 4.5 |
| 13 | 94.0 | 2.0 (23.3) | 2.5 (41.7) | 1.5 (25.0) | 0.19 | 2.56 | 141 | 55.1 | 249 | 4.4 |
| 14 | 90.0 | 7.5 (75.0) | 1.5 (15.0) | 1.0 (10.0) | 0.20 | 2.60 | 154 | 59.2 | 248 | 4.6 |

(*3): unit of (*3) is GPa · cm3/g
numerical value in parentheses indicates share of crystal phase proportion held by alumina, muliite, or sapphirine

TABLE 3

| Sample No. | Color tone by visual observation | Color shading | L* | a* | b* |
|---|---|---|---|---|---|
| 1 | gray | excellent | 72.5 | −4.0 | 1.7 |
| 2 | gray | excellent | 72.5 | −4.0 | 1.7 |
| 3 | gray | excellent | 70.6 | −4.9 | 1.6 |
| 4 | light gray | excellent | 84.3 | 0.6 | 0.4 |
| 5 | gray | excellent | 81.7 | −0.6 | 0.5 |
| 6 | dark gray | excellent | 19.5 | −24.7 | 2.0 |
| 7 | gray | good | 72.5 | 0.6 | 0.5 |
| 8 | greenish gray | good | 67.5 | −6.5 | 1.9 |
| 9 | gray | good | 74.0 | −0.6 | 0.1 |
| 10 | dark green | excellent | 12.1 | −29.3 | 2.1 |
| 11 | gray | excellent | 74.6 | −3.1 | 1.4 |
| 12 | gray | excellent | 76.3 | −2.2 | 1.2 |
| 13 | gray | excellent | 74.6 | −3.1 | 1.4 |
| 14 | gray | excellent | 72.4 | −4.0 | 1.7 |

Referring to Table 1 to Table 3, Sample Nos. 10 and 11, in which an aluminum oxide powder was not added, had low specific gravities, but had Young's moduli of 139 GPa or less and, therefore, the specific stiffness's were less than 56.0 GPa·cm³/g. Also, as for Sample No. 12, the amount of addition of Ca was small, Ca was not present at grain boundaries and, thereby, both the specific stiffness and the four-point bending strength were low. Also, as for Sample Nos. 13 and 14, the crystal phase proportions of cordierite serving as a main crystal phase were less than 95% by mass and, therefore, the thermal expansion coefficients became 0.19 ppm/° C. and 0.2 ppm/° C., which are large, respectively.

On the other hand, as for Sample Nos. 1 to 9 in which the crystal phase proportion of cordierite ($Mg_2Al_4Si_5O_{18}$) serving as a main crystal phase was 95% by mass or more and 97.5% by mass or less, the total of crystal phase proportions of alumina, mullite, and sapphirine serving as a sub crystal phase was 2.5% by weight or more and 5% by mass or less, and the content of Ca relative to the whole amount was 0.4% by mass or more and 0.6% by mass or less in terms of CaO, the following results were obtained: the absolute value of the thermal expansion coefficient was 0.1 ppm/° C. or less, the specific stiffness was 56.0 GPa·cm³/g or more, and the four-point bending strength was 240 MPa or more. Consequently, it was found that the cordierite sintered body having a small thermal expansion coefficient and high specific stiffness and mechanical strength was obtained. In addition, the thermal conductivity was 4.0 W/m·K or more and, therefore, it was found that good heat dissipation characteristic was exhibited with respect to the heat received during the exposure treatment and the like.

Meanwhile, as for Sample Nos. 1 to 5 in which the share of the crystal phase proportion of the sub crystal phase held by the alumina was 35% or more and 45% or less, the mullite held 25% or more and 35% or less, and the sapphirine held 25% or more and 40% or less, it was found that the absolute value of the thermal expansion coefficient was 0.03 ppm/° C. or less, the specific stiffness was 57 GPa·cm³/g or more, and the four-point bending strength was 250 MPa or more and, therefore, a better cordierite sintered body was obtained.

Furthermore, as for Sample Nos. 1 to 6 containing $MnCr_2O_4$ in a crystal phase, among Sample Nos. 1 to 9, color shading was at a low level on the basis of visual observation. Also, it was found that Sample Nos. 1 to 3 and 5 exhibiting the psychometric lightness L* of 70 or more and 82 or less and the psychometric chroma coordinates a* and b* of −5 or more and 1 or less and 0 or more and 2 or less, respectively, were cordierite sintered bodies capable of suppressing scattering of the light which exerted an influence on the exposure accuracy, while having the above-described good characteristics, having a color tone of gray, exhibiting reduced color shading, and being provided with the visibility and the antifouling property.

EXAMPLE 2

A cordierite sintered body was produced by decreasing the amount of addition of the synthetic cordierite powder correspondingly to addition of the zirconium oxide powder with reference to Sample No. 3 in Example 1. In this regard, Sample Nos. 15 to 22 were obtained, where the amounts of addition of the aluminum oxide powder and the calcium carbonate and the manufacturing method were the same as those in Example 1.

Then, the amount of Zr in the cordierite sintered body was determined with a wavelength dispersive X-ray micro analyzer (EPMA) and the content in terms of $ZrO_2$ is shown in Table 4. Meanwhile, test pieces were produced from the resulting sintered body. The thermal expansion coefficient and the four-point bending strength obtained by the same measuring methods as those in Example 1 are shown in Table 4. In this regard, the characteristic values of Sample No. 3 serving as the reference are also shown in Table 4.

TABLE 4

| Sample No. | Content of $ZrO_2$ relative to whole amount % by mass | Thermal expansion coefficient ppm/° C. | Four-point bending strength MPa |
|---|---|---|---|
| 3 | 0.00 | −0.030 | 250 |
| 15 | 0.01 | −0.029 | 253 |
| 16 | 0.10 | −0.026 | 255 |
| 17 | 0.30 | −0.017 | 260 |
| 18 | 0.60 | −0.003 | 270 |
| 19 | 1.00 | 0.015 | 265 |
| 20 | 2.00 | 0.060 | 260 |
| 21 | 3.00 | 0.100 | 253 |
| 22 | 3.10 | 0.110 | 250 |

Referring to Table 4, it was found that, in the case where the zirconia content was 3.0% by mass or less relative to the whole amount, the mechanical strength was able to be improved. Also, as is clear from the result of the thermal expansion coefficient, it was found that the thermal expansion coefficient was able to be adjusted by zirconia. Furthermore, when these samples were dipped into chemical agents of acids and alkalis, and changes in mass between before and after dipping was examined, it was found that when the zirconia content was large, a change in mass was small and the chemical resistance was high. Based on these results, the mechanical strength was able to be improved by specifying the zirconia content to be 3.0% by mass or less and, in addition, zirconia also served as an adjuster of the thermal expansion coefficient and was able to enhance the chemical resistance.

As described above, it was found that the cordierite sintered body according to the present embodiment had the above-described good characteristics and, thereby, was suitable for a member for semiconductor manufacturing apparatus.

The invention claimed is:

1. A cordierite sintered body, comprising:
    a crystal phase comprising:
        a main crystal phase essentially consisting of cordierite crystal grains; and
        a sub crystal phase comprising alumina crystal gains, mullite crystal gains and sapphirine crystal gains; and
    an amorphous phase containing Ca and located at grain boundaries of the cordierite crystal grains and sub crystal grains, wherein
    a crystal phase proportion of the main crystal phase to the crystal phase is 95% by mass or more and 97.5% by mass or less,
    a crystal phase proportion of the sub crystal phase to the crystal phase is 2.5% by mass or more and 5% by mass or less, and
    a content of Ca with respect to the whole amount of the sintered body is 0.4% by mass or more and 0.6% by mass or less in terms of CaO.

2. The cordierite sintered body according to claim 1, wherein the sub crystal phase comprises 35% or more and 45% or less of alumina, 25% or more and 35% or less of mullite, and 25% or more and 40% or less of sapphirine.

3. The cordierite sintered body according to claim 1, further comprising zirconia, wherein the content of zirconia relative to the whole amount is 3.0% by mass or less.

4. The cordierite sintered body according to claim 1, wherein the cordierite sintered body has
    a psychometric lightness L* is 70 or more and 82 or less in the CIE1976L*a*b* color space, and
    psychometric chroma coordinates a* and b* are −5 or more and 1 or less, and 0 or more and 2 or less, respectively in the CIE1976L*a*b* color space.

5. The cordierite sintered body according to claim 1, further comprising $MnCr_2O_4$ as a crystal phase.

6. A member for semiconductor manufacturing apparatus, the member consisting of the cordierite sintered body according to claim 1.

* * * * *